(12) United States Patent
Inoue et al.

(10) Patent No.: US 6,874,154 B2
(45) Date of Patent: Mar. 29, 2005

(54) PICKUP GUIDE SHAFT ADJUSTING DEVICE

(75) Inventors: Yoshinori Inoue, Saitama (JP); Katsuyoshi Sato, Saitama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 121 days.

(21) Appl. No.: 10/073,869

(22) Filed: Feb. 14, 2002

(65) Prior Publication Data

US 2002/0075787 A1 Jun. 20, 2002

Related U.S. Application Data

(63) Continuation of application No. PCT/JP01/04991, filed on Jun. 13, 2001.

(30) Foreign Application Priority Data

Jun. 15, 2000 (JP) ........................................ 2000-180392

(51) Int. Cl.[7] .................................................. G11B 7/08
(52) U.S. Cl. ...................................................... 720/675
(58) Field of Search .......................................... 369/249

(56) References Cited

U.S. PATENT DOCUMENTS

| | | | |
|---|---|---|---|
| 4,788,677 A | * 11/1988 | Ikedo et al. | 369/223 |
| 5,111,088 A | * 5/1992 | Fujino | 310/12 |
| 5,615,204 A | * 3/1997 | Watanabe et al. | 369/247 |
| 5,764,618 A | * 6/1998 | Kim | 369/219 |
| 5,982,735 A | * 11/1999 | Tsai | 369/219 |
| 5,995,478 A | * 11/1999 | Park | 369/219 |
| 6,285,649 B1 | * 9/2001 | Bessho et al. | 369/219 |
| 6,493,309 B2 | * 12/2002 | Sogawa et al. | 369/244 |

FOREIGN PATENT DOCUMENTS

| | | |
|---|---|---|
| JP | 11-025466 | 1/1999 |
| JP | 2000-057715 | 2/2000 |

* cited by examiner

*Primary Examiner*—David Davis
(74) *Attorney, Agent, or Firm*—Oblon, Spivak, McClelland, Maier & Neustadt, P.C.

(57) ABSTRACT

The positional adjustment of an optical disk pickup has generally been performed, within a holding member for holding the end portion of a pickup guide shaft, by clamping the guide shaft between an elastic member and an adjusting screw, and by adjusting the advance amount of the adjusting screw with respect to the holding member. However, there has been a problem that a linear positional adjustment and a fine adjustment are made difficult by the unevenness and tilt of the surface of the adjusting screw which is in contact with the guide shaft. Accordingly, in the pickup guide shaft adjusting device according to the present invention, when a main or an auxiliary pickup guide shaft 17 or 18 is to be clamped between the elastic member 34 or 41 and the adjusting screw 37 within a guide shaft adjusting and holding member 19, the adjusting screw 37 is placed so that the center thereof deviates from that of the guide shaft 17 or 18, tilt is provided to the surface of the elastic member 41 which is in contact with the guide shaft 17 or 18, and the front end of the adjusting screw 37 which is in contact with the guide shaft 17 or 18 is formed as semispherical shape, so that the positional adjustment of the guide shaft 17 or 18 by the adjusting screw 37 can be performed linearly and finely.

11 Claims, 10 Drawing Sheets

PICKUP GUIDE SHAFT ADJUSTING DEVICE

TECHNICAL FIELD

The present invention generally relates to an optical-disk recording or reproducing device having a pickup which performs writing or reading information by irradiating an optical disk with laser rays. Particularly, the present invention relates to a pickup guide shaft adjusting device which guides the pickup movably with respect to the optical disk.

BACKGROUND ART

In recent years, as recording media of information, optical disks named as a "CD" and a "DVD" have been developed for commercial use. For writing or reading information with respect to these optical disks, the optical disks are irradiated with laser rays, and the writing of information is performed by the irradiated laser rays, while the reading of information is performed by the reflected laser rays reflected from the optical disks.

The laser rays are generated and emitted by the laser-diode provided at the pickup, and the laser-rays reflected from the optical disk is received by a photo-diode likewise provided at the pickup. The pickup is disposed slidably in the radial direction of the optical disk.

The relationship between the optical disk and the pickup will now be described with reference to FIG. 8. FIG. 8 is a side view showing the configuration of the pickup unit in a conventional optical-disk recording or reproducing device.

In this pickup unit 101 of the conventional optical-disk recording or reproducing device, a spindle motor 103 is fixed to one end portion on the top surface of a chassis 102. A turntable 104 is affixed on the rotating shaft 103a of the spindle motor 103. On the top surface of the turntable 104, an optical disk 105 is placed and rotated by the rotational driving of the spindle motor 103.

A field motor 106 is affixed on the bottom surface of the chassis 102, and the rotating shaft of the field motor 106 extends up to the top surface of the chassis 102 through an opening (not shown) provided in the chassis 102. At the end portion of the rotating shaft, a motor gear 106a is affixed. A first large-diameter gear 107a is in mesh with this motor gear 106a, and a first small-diameter gear 107b is provided coaxially with the first large-diameter gear 107a. Also, a second large-gear 107c is in mesh with this first small-diameter gear 107b, and a second small-diameter gear 107d is provided coaxially with the second large-diameter gear 107c. Each of the above-described gears is rotatably affixed to the chassis 102.

On the top surface of the chassis 102, a rack with which the second small-diameter gear 107d is in mesh as a pinion gear, is formed at one side portion of the chassis 102, and a plate gear 108 which slidingly moves straightly according to the rotation of the second small-diameter gear 107d is provided. A pickup 109 is affixed at the one side portion opposite to the one side portion where the rack of plate gear 108 is provided. This pickup 109 is arranged to be slidably secured by a pair of guide shafts 110 provided in parallel with the plate gear 108 (in FIG. 8, one guide shaft 110 alone is shown). The pickup 109 is affixed to the plate gear 108 so that the laser-ray emitting optical axis and the laser-ray receiving optical axis form a predetermined angle with respect to the information recording surface of the optical disk 105.

Here, the rotational driving of the field motor 106 is transmitted from the motor gear 106a to the first large and small diameter gears 107a and 107b, and the second large and small diameter gears 107c and 107d, and the plate gear 108 moves in the horizontal direction in the figure by the rotation of the second small diameter gear 107d. Thereby, the pickup 109 affixed to the plate gear 108 slidingly moves in the horizontal direction in the figure under the guide of the guide shaft 110. That is, the pickup 109 slidingly moves from the initial position of information recording on the inner peripheral side of the optical disk 105 toward the outer peripheral side thereof up to the position 109' indicated by the dotted lines in the figure.

At this time, the distance between the optical disk 105 and the pickup 109 must be maintained at a predetermined dimension. Specifically, the demension of the distance "h1" between the bottom surface (in the figure) of the optical disk 105 and the top surface (in the figure) of the pickup 109 when the pickup 109 is situated at the initial position on the inner peripheral side of the optical disk 105, and the demension of the distance "h2" between the optical disk 105 and the pickup 109 when the optical pickup has moved up to the position 109' corresponding to the edge portion on the outer peripheral side of the optical disk 105, must be kept at the same value (i.e., h1=h2).

For this purpose, the guide shaft 110 is arranged so that the end portions thereof are held so as to be adjusted by a guide shaft fixing member 111a and a guide shaft holding member 111b. More specifically, the guide shaft fixing member 111a fixes the guide shaft 110 at a standard guide shaft position, while the guide shaft holding member 111b has an elastic member and an adjusting screw each for adjusting the position of the guide shaft 110 in the vertical direction in the figure.

The configuration of this guide shaft holding member 111b will be described with reference to FIGS. 9 to 11. FIG. 9 is a developed perspective view showing the conventional guide shaft holding member, FIG. 10 is a sectional view thereof, and FIG. 11 is a view explaining the problem associated with the conventional guide shaft holding member.

The guide shaft holding member 111b comprises a bearing stand 121, an elastic member 124, an adjusting screw support plate 125, and an adjusting screw 127. In one side surface of the bearing stand 121, there is formed a shaft holding groove 122 in which the guide shaft 110 is to be inserted from the top surface (in the figure) and to be held. This shaft holding groove 122 in the bearing stand 121 comprises an opening which has a diameter slightly larger than that of the guide shaft 110, and a substantially tubular space portion 123 described later into which the elastic member 124 and the adjusting screw 127 are to be inserted. Also, screw holes 121a and 121b, which are described later, for affixing the adjusting screw support plate 125 are provided on the top surface of the bearing stand 121.

The elastic member 124, which is a helical spring, is fitted and inserted into the space portion 123 in the shaft holding groove 122 of the bearing stand 121. An end portion of the guide shaft 110 is inserted into the holding groove 122 of the bearing stand 121 from the shaft holding groove 122, and is placed on the top surface of the elastic member 124.

The adjusting screw support plate 125 is a planar metallic material having a shape and a size to be placed on the top surface of the bearing stand 121. On a substantially central portion of this adjusting screw support plate 125, a female screw hole 126 is provided at the position corresponding to the space portion 123 in the bearing stand 121. Also, screw through-holes 125a and 125b are formed at the positions corresponding to the screw holes 121a and 121b in the bearing stand 121, and thereby the adjusting screw support plate 125 is fixed to the bearing stand 121 by screws 128a and 128b.

The adjusting screw 127 constitutes a male screw to be engaged with the female screw hole 126 in the adjusting screw support plate 125. After the elastic member 124 and the guide shaft 110 have been inserted into the shaft holding groove 122 in the bearing stand 121, the adjusting screw support plate 125 is secured by the screws 128a and 128b, and the adjusting screw 127 is engaged with the female screw hole 127 in the adjusting screw support plate 125. Then, by pressing the guide shaft 110 by the front end of the adjusting screw 127 against the elastic force of the elastic member 124, the position of the guide shaft 110 is adjusted.

Such a guide shaft holding member 111b is arranged so that the center of the guide shaft 110 and that of the adjusting screw 127 correspond with each other (see FIG. 10). As the adjusting screw 127, a ready-made screw is generally used. In general, therefore, the front end of the adjusting screw 127 which is in contact with the guide shaft 110 is only cut in a planar form without being subject to an accurate plane machining, so that the front end thereof includes unevenness and tilt to some extent. In order to smoothly perform the adjustment, the width of the shaft holding groove 122 is formed slightly larger than the diameter of the guide shaft 110, allowing for manufacturing errors. If the width of the shaft holding groove 122 is smaller than the diameter of the guide shaft 110, the guide shaft 110 will be inserted into the shaft holding groove 122 with pressure, thereby causing the dysfunction of the elastic force of the elastic member 124. As a result, the position of the guide shaft 110 will vary when subjected to vibration.

On the other hand, when a positional adjustment is to be performed by rotating the adjusting screw 127 and moving the guide shaft 110 in the vertical direction in the figure against the elastic force of the elastic member 124, it is desirable to be able to linearly adjust the height "h" with respect to the rotational pitch "t" of the adjusting screw 127 as indicated by the dotted line in FIG. 11. However, since the front end of the adjusting screw 127 which is in contact with the guide shaft 110, for example, has tilt as described above, the moving amount of the height becomes non-linear with respect to the rotational pitch "t" of the adjusting screw 127 as indicated by the solid line in FIG. 11, so that an accurate and fine positional adjustment of the guide shaft 110 becomes difficult. Moreover, since there exists a gap between the shaft holding groove 122 and the guide shaft 110, the guide shaft 110 undergoes the force of the adjusting screw 127 in the rotational direction by the rotation thereof and thereby moved within the shaft holding groove 122 in the horizontal direction in the figure. As a consequence, similarly, a fine adjustment of the guide shaft 110 becomes difficult.

As described above, the pickup 109 is provided with another guide shaft besides the illustrated guide shaft 110. This other guide shaft is disposed on the opposite side of the guide shaft 110 shown in FIG. 8 (i.e., on the rear side of the plane of the figure), and is engaged with the guide hole or the guide groove on the rear side of the plane of the figure showing the pickup 109. Both ends of this other guide shaft are held by guide shaft holding members each having an adjusting function for the guide shaft position similar to the guide shaft holding member 111b, thereby achieving an adjustment of the relative position with respect to the optical disk on the rear side of the plane of the figure showing the pickup 109.

As described above, the conventional positional adjustment of the pickup with respect to the optical disk is performed by means of the guide shaft holding members having the function of positional adjustment for the guide shaft, and provided at one end or both ends of each of the guide shafts for the pickup. In summary, the guide shaft holding member comprises a bearing stand having a shaft holding groove into which the guide shaft is inserted, an elastic member and an adjusting screw each disposed within this holding groove. The guide shaft holding member clamps the guide shaft between the elastic member and the adjusting screw, and performs a positional adjustment of the guide shaft by the rotational pitch of the adjusting screw.

However, since the surface of the adjusting screw which is in contact with the guide shaft has a configuration including unevenness and tilt, the movements of the guide shaft becomes irregular ones corresponding to the front end configuration of the adjusting screw, so that it is difficult to perform a guide shaft position adjustment in proportion to the rotational pitch of the adjusting screw. This has raised a problem that the optimum position setting for the guide shaft is very hard.

With a view to solving these problems caused by the conventional guide shaft position adjusting device, the object of the present invention is to provide an optical-disk pickup guide shaft adjusting device capable of a high-degree of adjustment, by causing guide shaft holding members having the position adjusting function by adjusting screws and elastic members provided at one end or both ends of the guide shaft, to have a construction allowing a linear positional adjustment of the guide shaft with respect to the rotational pitch of the adjusting screw.

DISCLOSURE OF THE INVENTION

The pickup guide shaft adjusting device according to the present invention is characterized by comprising a pickup which performs the writing or reading of information by irradiating a recording medium with laser rays; a guide shaft by which the pickup is movably supported; and at least one holding member which holds at least one end portion of the guide shaft. This holding member includes a groove portion for holding the guide shaft in the radial direction thereof; an elastic member for elastically supporting the guide shaft inserted into the groove portion, with respect to the holding member; and a screw which presses the guide shaft into contact with the elastic member against the elastic force thereof, and which adjusts the holding position of the guide shaft within the holding member. Herein, this screw is placed so that the center thereof deviates from the widthwise center of the guide shaft inserted into the groove, in a predetermined direction.

Moreover, the pickup guide shaft adjusting device according to the present invention is characterized by comprising a pickup which performs the writing or reading of information by irradiating a recording medium with laser rays; a guide shaft by which the pickup is movably supported; and at least one holding member which holds at least one end portion of the guide shaft. This holding member includes a groove portion for holding the guide shaft in the radial direction thereof; an elastic member for elastically supporting the guide shaft inserted into the groove portion, with respect to the holding member; and a screw which presses the guide shaft into contact with the elastic member against the elastic force thereof, and which adjusts the holding position of the guide shaft within the holding member. Herein, the above-described elastic member has a tilting portion tilting in the widthwise direction of the guide shaft, and formed at the portion of the elastic member which is in contact with the guide shaft.

Furthermore, the pickup guide shaft adjusting device according to the present invention is characterized by comprising a pickup which performs the writing or reading of information by irradiating a recording medium with laser rays; a guide shaft by which the pickup is movably supported; and at least one holding member which holds at least one end portion of the guide shaft. This holding member includes a groove portion for holding the guide shaft in the radial direction thereof; an elastic member for elastically supporting the guide shaft inserted into the groove portion, with respect to the holding member; and a screw which presses the guide shaft into contact with the elastic member against the elastic force thereof, and which adjusts the holding position of the guide shaft within the holding member. Herein, this screw is placed so that the center thereof deviates from the widthwise center of the guide shaft inserted into the groove, in a predetermined direction, and the above-described elastic member has a tilting portion tilting in the widthwise direction of the guide shaft, and formed at the portion of the elastic member which is in contact with the guide shaft.

The pickup guide shaft adjusting device according to the present invention is characterized in that the above-described holding members respectively hold both end portions of the guide shaft, and that the screws in the holding members are placed so that the centers thereof deviate in the same direction in the width direction of the guide shaft.

The pickup guide shaft adjusting device according to the present invention is characterized in that the above-described holding members respectively hold both end portions of the guide shaft, and that the elastic members in the holding members are placed so that the tilting portions thereof have the same tilting direction.

The pickup guide shaft adjusting device according to the present invention is characterized in that the above-described holding members respectively hold both end portions of the guide shaft, that the screw in the holding members are placed so that the center thereof deviate in the same direction in the widthwise direction of the guide shaft, and that the elastic members in the holding members are placed so that the tilting portions thereof have the same tilting direction.

The pickup guide shaft adjusting device according to the present invention is characterized in that the section of the guide shaft has a substantially circular shape, and that the front end of the screw which is in contact with the guide shaft is formed as a substantially semicircular shape.

The pickup guide shaft adjusting device according to the present invention is characterized in that the guide shaft is constituted of a pair of guide shafts, i.e., a main guide shaft and an auxiliary guide shaft, and that the holding members hold at least one end portion of the main guide shaft and both end portions of the auxiliary guide shaft.

By the pickup guide shaft adjusting device according to the present invention, it becomes possible to linearly and finely adjust and set the relative position of the pickup with respect to the optical disk in virtue of the above-described adjusting screw.

BRIEF DESCRIPTION OF THE DRAWINGS

FIGS. 1(a) and 1(b) are perspective views explaining the overall configuration of a pickup unit using an optical-disk pickup guide shaft adjusting device according to the present invention, wherein FIG. 1(a) is a top surface view, and wherein FIG. 1(b) is a bottom surface view.

FIGS. 4(a) and 4(b) are views showing the shape of the elastic member used in another embodiment of the optical-disk pickup guide shaft adjusting device according to the present invention, wherein FIG. 4(a) is a plan view, and wherein FIG. 4(b) is a top plan view.

BEST MODE FOR CARRYING OUT THE INVENTION

Figure 1A:
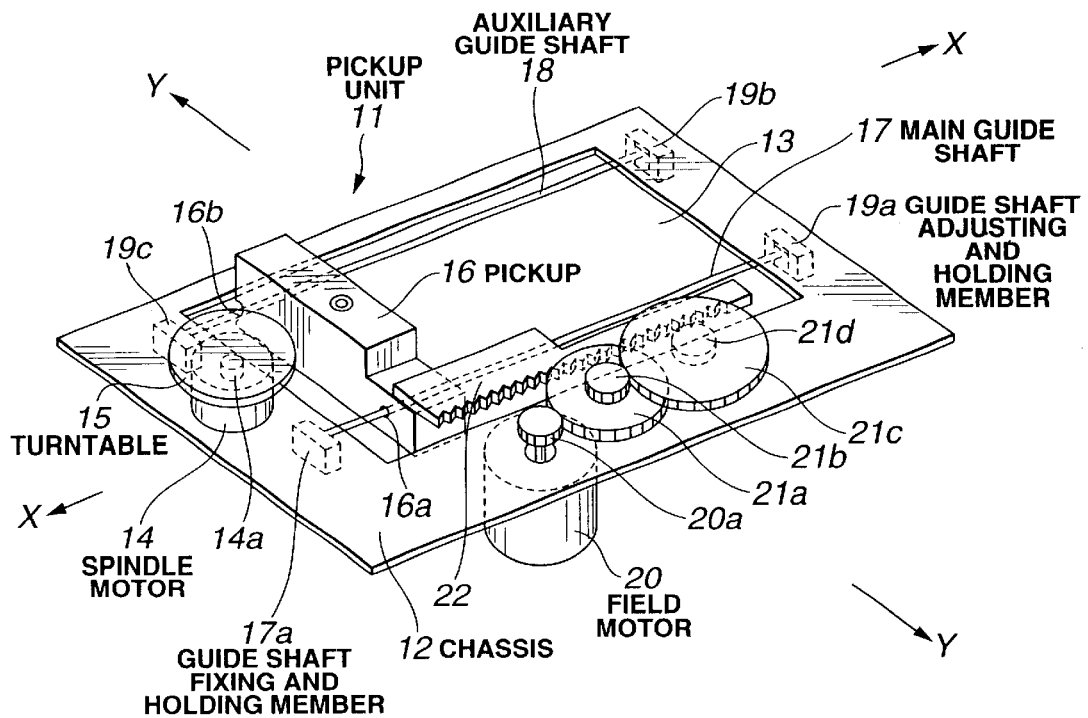
Figure 1B:
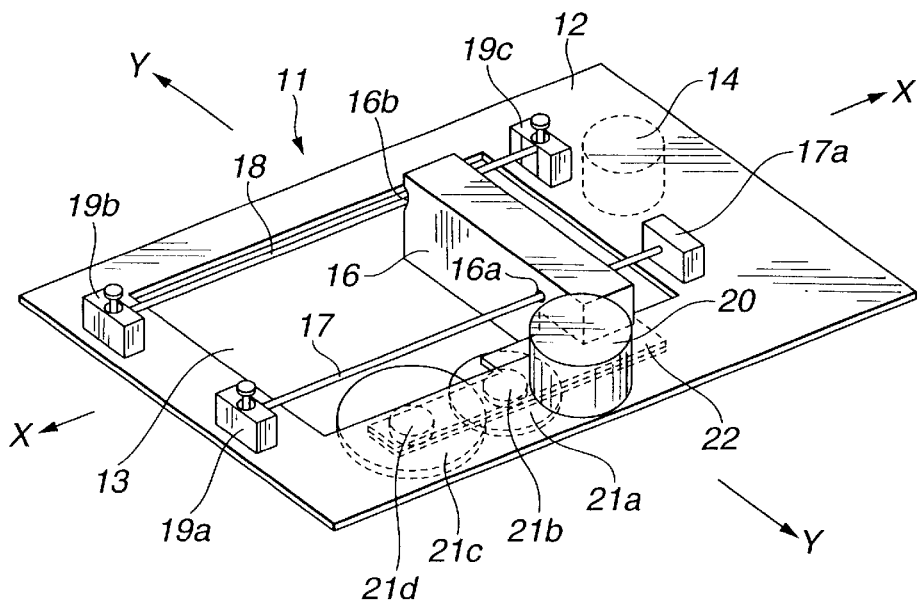
Figure 2:
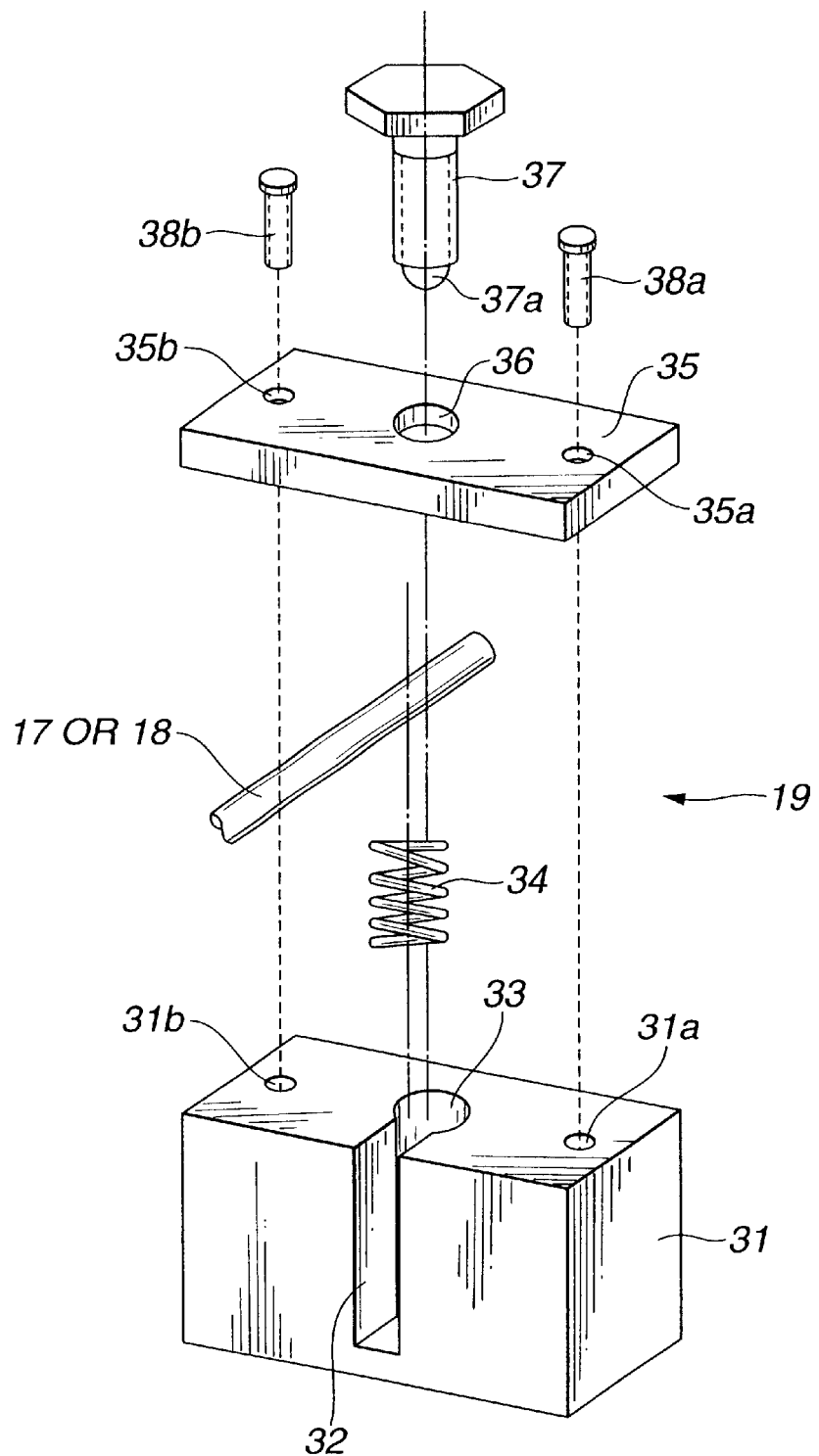
FIG. 2 is a developed perspective view showing the overall configuration of an embodiment of the optical-disk pickup guide shaft adjusting device according to the present invention.
Figure 3:
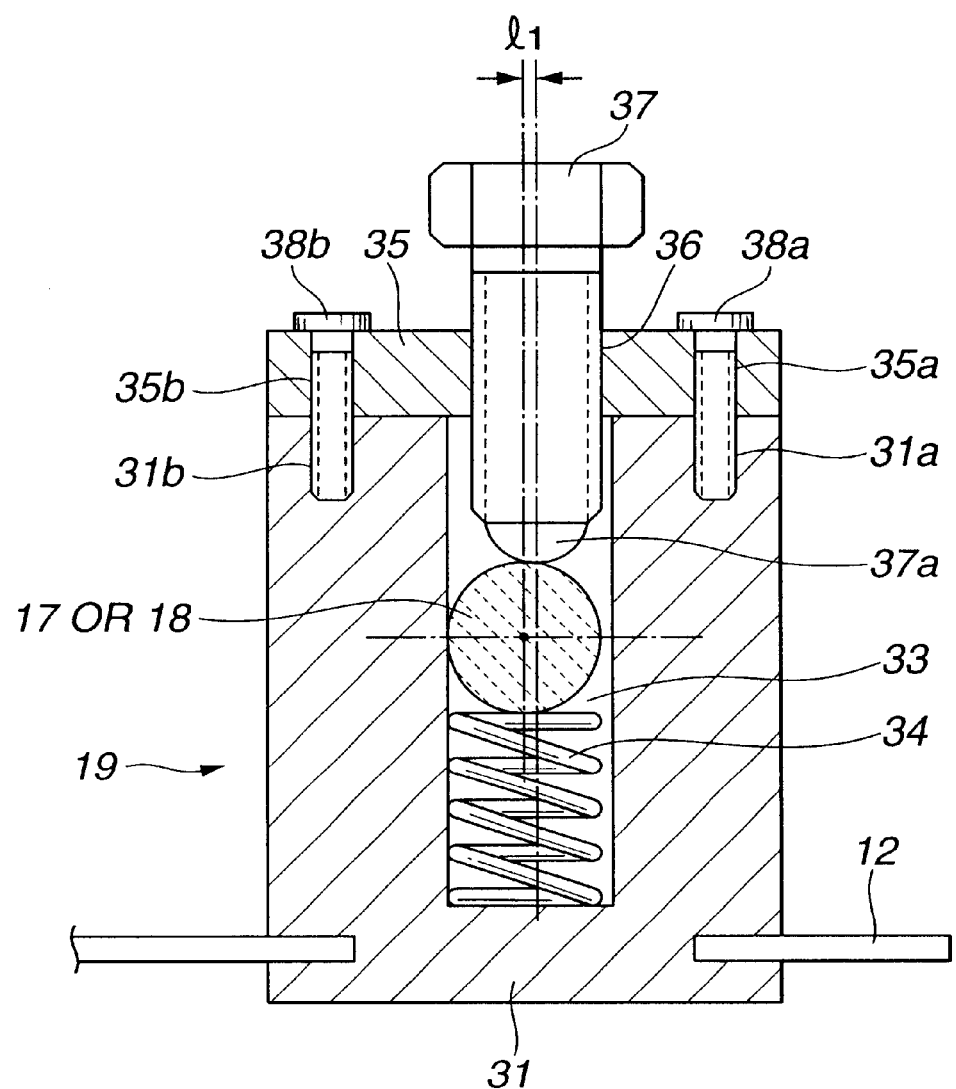
FIG. 3 is an exploded section view showing the overall configuration of the embodiment of the optical-disk guide guide shaft adjusting device according to the present invention.

Hereinafter, the embodiments according to the present invention will be described in detail with reference to the drawings. FIGS. 1(a) and 1(b) are perspective views explaining the overall configuration of a pickup unit using an optical-disk pickup guide shaft adjusting device according to the present invention, wherein FIG. 1(a) is a top surface perspective view, and wherein FIG. 1(b) is a bottom surface perspective view. FIG. 2 is a developed perspective view showing the overall configuration of an embodiment of the optical-disk pickup guide shaft adjusting device according to the present invention, and FIG. 3 is an exploded section view showing the overall configuration of the embodiment of the optical-disk pickup guide shaft adjusting device according to the present invention.

First, description will be made of the overall configuration of the optical-disk pickup unit, with eference to FIGS. 1(a) and 1(b). In these figures, reference numeral 11 denotes a pickup unit. At a substantially central ortion of a tabular chassis 12 in this pickup unit 11, a pickup 16 described later is disposed, and a horizontally-long rectangular opening 13 for the pickup 16 to slidingly move in the radial direction of an optical disk (not shown) is provided. A spindle motor 14 is fixed in the vicinity of one end of a single side of the horizontally-long rectangular opening 13, on the top surface of the chassis 12.

A turntable 15 on which the optical disk is to be placed is secured to the rotating shaft 14a of the spindle motor 14. In the opening 13, there is provided a pickup 16 which irradiates the optical disk placed on the turntable 15 with laser rays, and which receives the reflected laser rays from the optical disk.

On a mounting base on the opposite side of the surface of the pickup 16 from which laser rays are applied to the optical disk, or on which the reflected rays from the optical disk are received, there are provided an insertion hole 16a and an insertion recess 16b described later. A main guide shaft 17 is inserted into the above-mentioned insertion hole 16a of the pickup 16, while an auxiliary guide shaft 18 is inserted into the above-mentioned insertion recess 16b.

The main guide shaft 17 and the auxiliary shaft 18 are affixed to the chassis 12, respectively by a guide shaft fixing and holding member 17a and a guide shaft adjusting and holding member 19a described later, and a guide shaft adjusting and holding members 19b and 19c described later, in a manner such that each of the guide shafts are in parallel with the long side of the horizontally-long rectangular opening 13. That is, the pickup 16 is inserted into the main and auxiliary shafts 17 and 18, and are slidingly moved within the opening 13 along the guide shafts 17 and 18 by the driving capability described later.

On the bottom surface side of the chassis 12, a field motor 20 is fixed in the vicinity of the one end portion of a long side of the opening 13, and the motor shaft of the field motor 20 is extended up to the surface of the chassis 12 through a motor-shaft insertion hole provided in the chassis 12, whereby a motor gear 20a is affixed to this motor shaft of the field motor 20. A first large-diameter gear 21a is in mesh with this motor gear 20a of the field motor 20, and is also provided with a first small-diameter gear 21b which is fixed coaxially therewith. A second large-diameter gear 21c is in mesh with this small-diameter gear 21b, and is also provided with a second small-diameter gear 21d which is fixed coaxially therewith. This second small-diameter gear (pinion) 21d is in mesh with a plate gear (rack) 22 on which gear is formed on one side face of a plate, and which is disposed in parallel with the main and auxiliary guide shafts 17 and 18. The pickup 16 is secured to one end of the planar portion of the plate gear 22.

In short, the rotation of the field motor 20 is transferred to the plate gear 22 through the intermediary of the motor gear 20a, the first large-diameter and small-diameter gears 21a and 21b, and the second large-diameter and small-diameter gears 21c and 21d. The plate gear 22 is slidingly moved in the X—X direction (in the figure) corresponding to the radial direction of the optical disk, by the rotational driving of the above-described second small-diameter gear 21d. With the sliding movement of the plate gear 22 in the X—X direction, the pickup 16 affixed to the plate gear 22 also moves in the X—X direction under the guide of the main and auxiliary guide shafts 17 and 18. Namely, the field motor 20, the first large-diameter and small-diameter gears 21a and 21b, the second large-diameter and small-diameter gears 21c and 21d, and the plate gear 22 constitute a driving mechanism for the pickup 16.

When the pickup 16 is to be slidingly moved in the X—X direction under the guide of the main and auxiliary guide shafts 17 and 18, it is necessary to maintain the constant distance between the pickup 16 and the optical disk placed on the turntable 15. For this purpose, one end portion of the main guide shaft 17 (i.e., the end side where the spindle motor 14 is provided, in the figure) is fixed by the guide shaft fixing and holding member 17a for fixing the installation position of the guide shaft, in order to set a standard guide shaft installation position. The other end portion of the main guide shaft 17 is held by the guide shaft adjusting and holding member 19a having a mechanism capable of adjusting the tilt of main guide shaft 17 in the X—X direction in the figure.

Furthermore, in order to adjust the tilt of the pickup 16 in the Y—Y direction in the figure, both end portions of the auxiliary guide shaft 18 are held by the guide shaft adjusting and holding members 19b and 19c having a function capable of adjusting the tilt of auxiliary guide shaft 18 as in the case where the guide shaft adjusting and holding member 19a holds the other end portion of the main guide shaft.

Specific configurations of these guide shaft adjusting and holding member 19a to 19c will be described with reference to FIGS. 2 and 3. Here, since the guide shaft adjusting and holding member 19a to 19c have the same fundamental configuration, these are denoted by reference numeral 19 in the drawings.

The guide shaft adjusting and holding member 19 comprises a bearing stand 31, an elastic member 34, an adjusting screw support plate 35, and an adjusting screw 37. On one side surface of the bearing stand 31, there is formed a shaft holding groove 32 in which an end portions of the main or auxiliary guide shaft 17 or 18 is to be inserted from the top surface (in the figure) and to be held. This shaft holding groove 32 in the bearing stand 31 is formed by connecting an opening which has a diameter slightly larger than the diameter of the main or auxiliary guide shaft 17 or 18 and a substantially tubular space portion 33 described later into which the elastic member 34 and the adjusting screw 37 are to be inserted. Also, screw holes 31a and 31b, which are described later, for securing the adjusting screw support plate 35 are provided on the top surface of the bearing stand 31.

The elastic member 34, which is a helical spring (compression spring) is inserted into the space portion 33 in the shaft holding groove 32 of the bearing stand 31. An end portion of the main or auxiliary guide shaft 17 or 18 is inserted into the shaft holding groove 32 in the space portion 33 of the bearing stand 31 and placed on the top surface of the elastic member 34. Here, when a helical spring is used as the elastic member 34, if the spring is pressed by the adjusting screw 37 with the guide shaft 17 or 18 placed on the top surface of the spring, the diameter of the spring will be enlarged, and hence, the diameter of the space portion 33 in the bearing stand 31 is formed as the dimension allowing for the diameter of the spring when enlarged.

The adjusting screw support plate 35 is a planar metallic material having a shape and a size to be placed on the top surface of the bearing stand 31. On a substantially central portion of this adjusting screw support plate 35, there is provided a female screw hole 36 having a female screw with which the adjusting screw 37 is engaged. Also, screw through-holes 35a and 35b are formed at the positions corresponding with the screw holes 31a and 31b provided on the top surface of the bearing stand 31, and the adjusting screw support plate 35 is secured to the bearing stand 31 by screws 38a and 38b.

The adjusting screw 37 constitutes a male screw to be engaged with the female screw hole 36 in the adjusting screw support plate 35. The adjusting screw 37 is arranged so that the front end thereof makes contact with the main or auxiliary guide shaft 17 or 18 by engaging the adjusting screw 37 with the female screw hole 36 in the adjusting screw support plate 35 and inserting it into the space portion 33 of the bearing stand 31.

The adjusting screw 37 has a spherical front end 37a formed as semispherical shape. Also, the female screw hole 36 provided in the adjusting screw support plate 35 is formed so that the adjusting screw 37 has a positional relation that the center of the adjusting screw deviates from that of the main or auxiliary guide shaft 17 or 18 inserted into the shaft holding groove 32 and the space portion 33, by the dimension "l1" in th figure (see FIG. 3).

In the space portion 33 of the bearing stand 31, the elastic member 34 and the guide shaft 17 or 18 have been inserted and placed in this order, then the adjusting screw support plate 35 is affixed by the screws 38a and 38b, and the adjusting screw 37 is engaged with the female screw hole 36 in the adjusting screw support plate 35. Thereafter, the front end of the adjusting screw 37 is inserted into the space portion 33, and the guide shaft 17 or 18 is pressed by the spherical front end 37a of the adjusting screw 37 against the elastic force of the elastic member 34.

Thereby, the main or auxiliary guide shaft 17 or 18 is clamped between the elastic member 34 and the adjusting screw 37, and then by adjusting the insertion amount of the adjusting screw with respect to the space portion 33 by the rotational pitch of the adjusting screw 37, the holding position of the main or auxiliary pickup guide shaft 17 or 18 within the space portion 33 can become adjustable.

In this holding position adjustment of the main or auxiliary pickup guide shaft 17 or 18, by deviating the center of the adjusting screw 37 and that of the main or auxiliary guide shaft 17 or 18 from each other by a dimension "l1", the main or auxiliary guide shaft 17 or 18 moves within the shaft holding groove 32 in the vertical direction in the figure by the rotation of the adjusting screw 37, while being abutted against the inner wall surface of the shaft holding groove 32 in the opposite direction to the deviation direction of the adjusting screw 37, i.e., the inner wall in the left direction in the figure. Moreover, the arcuate surface of the main or auxiliary guide shaft 17 or 18 makes contact with the spherical surface of the spherical front end 37a of the adjusting screw 37. As a result, when the position of the main or auxiliary guide shaft 17 or 18 is to be adjusted by rotating the adjusting screw 37, it becomes possible to adjust the position of the main or auxiliary guide shaft 17 or 18 linearly with the respect to the rotation pitch of the adjusting screw 37.

Meanwhile, as the elastic member 34, a helical spring has been used. However, a leaf spring may be employed instead of the helical spring.

Figure 4A:
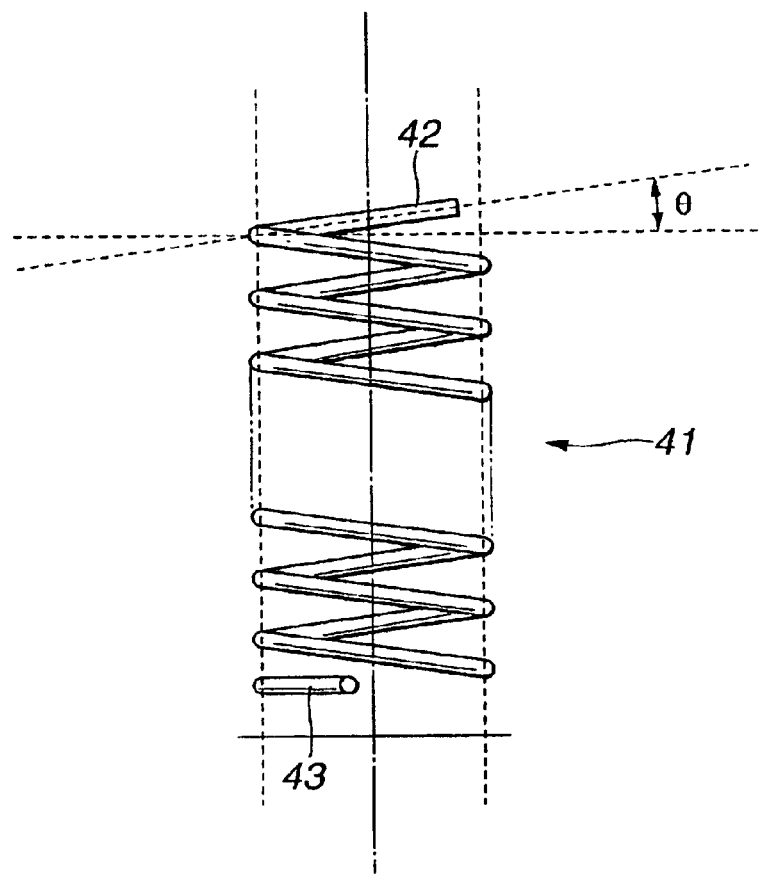
Figure 4B:
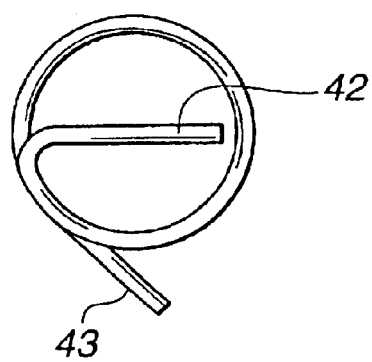
Figure 5:
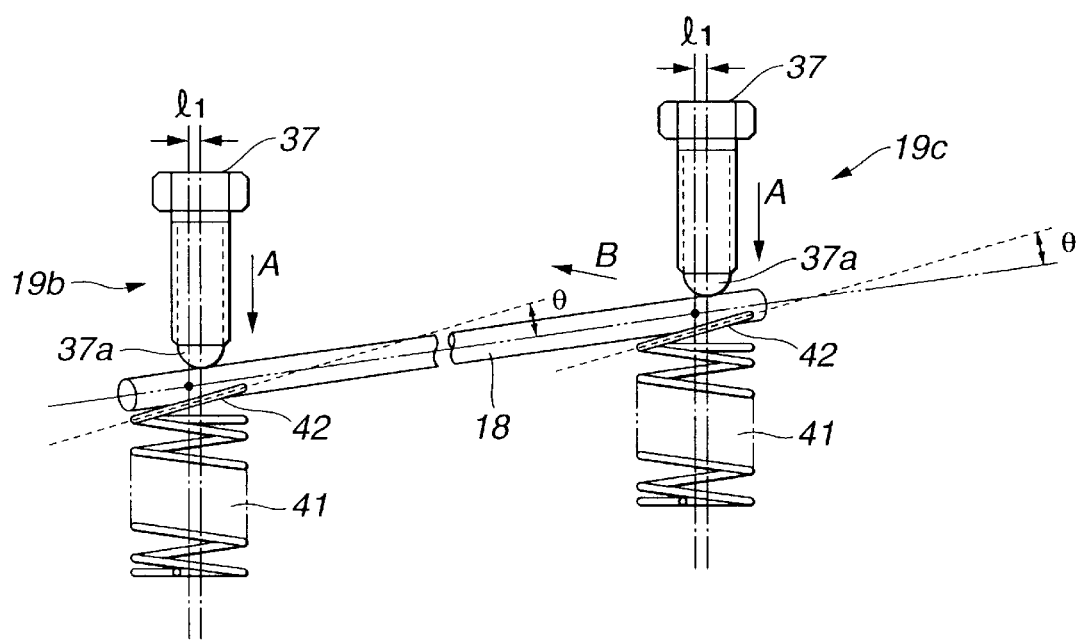
FIG. 5 is a view explaining the configuration of the other embodiment of an optical-disk pickup guide shaft adjusting device according to the present invention.

Next, another embodiment according to the present invention will be described with reference to FIGS. 4(a), 4(b) and FIG. 5. FIGS. 4(a) and 4(b) are plan views showing the shape of the elastic member used in an optical-disk pickup guide shaft adjusting device according to the present invention, wherein FIG. 4(a) is a front view, and wherein FIG. 4(b) is a top plan view. FIG. 5 is a view explaining the configuration of the other embodiment of an optical-disk pickup guide shaft adjusting device according to the present invention.

In the embodiments illustrated in FIGS. 1(a) and 1(b), and FIGS. 2 and 3, the above-described elastic member 34 to be inserted into the space portion 33 of the bearing stand 31, is a spring formed by spirally coiling an elastic line material, and more specifically, both end portions of the elastic member 34 are formed so as to be planes in the direction of the spiral diameter, or are formed by bending so as to become planes in the direction thereof.

In another embodiment according to the present invention, an elastic member 41 shown in FIGS. 4(a) and 4(b) is used instead of the above-described elastic member 34. This elastic member 41 is a spring formed by spirally coiling an elastic material, and the line material end portion on the side in contact with the main or auxiliary guide shaft 17 or 18 is formed so as to have a tilting portion 42 with an tilting angle θ. Simultaneously, the end portion of the line material to be placed on the bottom surface of the space portion 33 in the bearing stand 31 is arranged to have a positioning portion 43 formed so as to extend from the above-described spiral outer diameter. It can be said that, by forming the line material end portion on the side in contact with the main or auxiliary guide shaft 17 or 18 so as to have a tilting portion 42 with an tilting angle θ as shown in FIG. 4(a), the line material end portion constitutes shaft-position regulating means which regulates the shaft position so that the shaft comes to a lower position of the tilting surface when the main or auxiliary guide shaft 17 or 18 is placed on the tilting portion 42.

FIG. 5 explains the relationship between the main or auxiliary guide shaft 17 or 18 and the adjusting screw 37 when the elastic member thus formed is inserted and placed in the space portion 33. In FIG. 5, the position adjustment for the auxiliary guide shaft 18 will be described as an example.

Each of the end portions of the auxiliary guide shaft 18 is placed on the tilting surface of the tilting portion 42 of the elastic member 41, and the front end of the adjusting screw 37 is made to contact with the end portion of the guide shaft 18. Herein, by the pressing force of the adjusting screw 37, the auxiliary guide shaft 18 moves down toward the lower part of the tilting portion 42 of the elastic member 41, until it is abutted against the inner wall-surface of the shaft holding groove. Furthermore, the arcuate portion of the auxiliary guide shaft 18 and the spherical front end portion 37a of the adjusting screw 37 come into contact, thereby allowing the linear positional adjustment of the auxiliary guide shaft 18 by the adjusting screw 37.

Moreover, since the position deviation amount "l2" of the center of the auxiliary guide shaft 18 from the center of the adjusting screw 37 can be minimized, the inner diameter of the space portion 33 in the bearing stand 31 and the outer dimension of the elastic member 41 can be formed slightly larger than the outer dimension of the male screw portion of the adjusting screw 37.

Furthermore, when both end portions of the auxiliary guide shaft 18 are disposed in the guide shaft adjusting and holding members 19b and 19c, they must be affixed so that the tilting portions 42 of elastic members 41 have the same tilting direction. If the tilting directions of the tilting portions 42 of the elastic members 41 are different between both end portions of the auxiliary guide shaft 18, the position deviation amounts of the auxiliary guide shaft 18 when pressed by the adjusting screw 37 will become different between both end portions of the auxiliary guide shaft, thereby making the positional adjustment of the auxiliary guide shaft 18 difficult.

It is, therefore, necessary that the tilting portions 42 of the elastic members 41 are inserted and placed so as to have the same tilting direction, in the space portion 33 of the bearing stands 31 of guide shaft adjusting and holding members 19b and 19c which holds both end portions of the auxiliary guide shaft 18.

Specifically, with the auxiliary guide shaft 18 subjected to a pressing force by the adjusting screw 37 as indicated by the arrow A in the figure, when the tilting portions 42 of the elastic members 41 in the guide shaft adjusting and holding members 19*b* and 19*c* are set to have rightward tilts, both ends of the guide shaft 18 are pressed in the same direction indicated by the arrow B in the figure, and thereby the positional adjustment is performed. In contrast, if the tilting portions 42 of the elastic members 41 in the guide shaft adjusting and holding members 19*b* and 19*c* at both end portions of the auxiliary guide shaft 18 have tilts in the direction opposite to each other, the guide shaft 18 will suffer distortions, thereby impairing the linear movement adjustment in the positional adjustment.

As described above, the line material end portion of the elastic member 41 on the side of which is contact with the main or auxiliary guide shaft 17 or 18 is formed linearly so as to have a tilting portion 42 with an tilting angle θ. Alternatively, however, the linear tilting portion 42 may be formed as a concavely curved tilting portion, or the front end of the free end portion of the line material may be formed as a convexly bent shape. By forming the line material end portion into such shapes, when the main or auxiliary guide shaft 17 or 18 is placed on the tilting portion 42, it is possible to provide the tilting portion 42 with an effect of facilitating introducing the main or auxiliary guide shaft 17 or 18 to a lower position of the tilting surface.

Figure 6A:
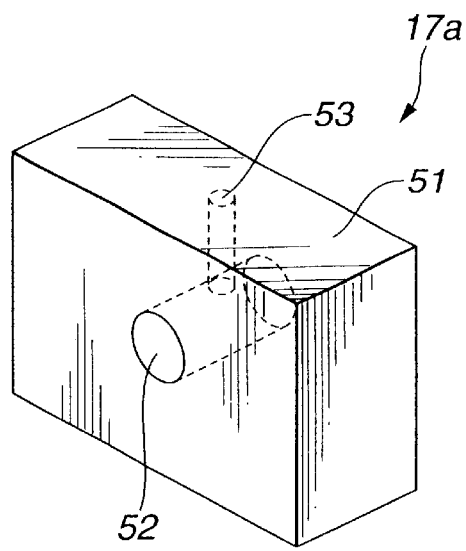
FIG. 6(a) is a perspective view explaining the configuration of the bearing stand for the guide shaft fixing and holding member used in the optical-disk pickup guide shaft adjusting device according to the present invention.
Figure 6B:
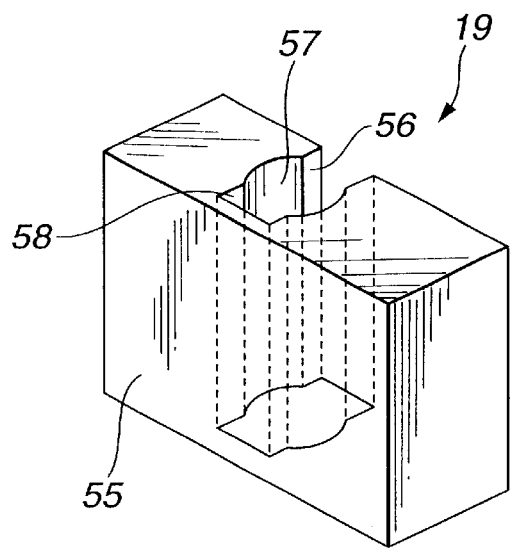
FIG. 6(b) is a perspective view explaining the configuration of the bearing stand for the guide shaft adjusting and holding member.
Figure 6C:
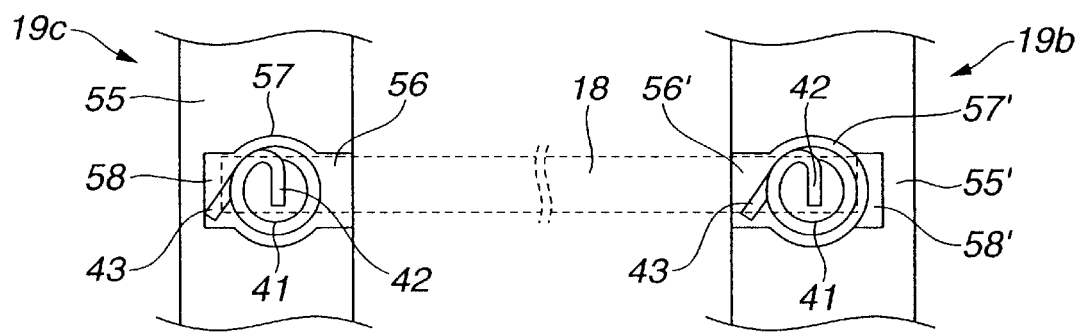
FIG. 6(c) is a plan view showing the guide shaft adjusting and holding members for holding both ends of the auxiliary guide shaft.

Next, a modification of each of the guide shaft fixing and holding member 17*a* and the guide shaft adjusting and holding member 19 of the main guide shaft will be described with reference to FIGS. 6(*a*), 6(*b*), and 6(*c*).

FIG. 6(*a*) illustrates a bearing stand 51 of the guide shaft fixing and holding member 17*a* in which one end of the main guide shaft 17 is to be inserted and fixed. One portion of the main guide shaft 17 is inserted into one side surface of the side surface of this bearing stand 51, and a shaft holding hole 52 is provided at the standard position for the main guide shaft 17. A screw hole 53 is provided which engages a fixing screw (not shown) with a shaft holding hole 52 from the top surface of the bearing stand 51. After the end portion of the main guide shaft 17 has been inserted into the shaft holding hole 52, the main guide shaft 17 is fixed by the fixing screw from the screw hole 53.

When the end portion of the main guide shaft 17 can be sufficiently inserted and fixed in the standard position only by using the shaft holding hole 52, it is unnecessary to fix the main guide shaft 17 by the fixing screw using the screw hole 53. Specifically, the eliminating of the need to fix the main guide shaft 17 by the screw is achieved by forming the diameter of the shaft holding hole 52 slightly smaller than that of the main guide shaft 17, and pressing the main guide shaft 17 into the shaft holding hole 52. Alternatively, the avoiding of the need for the fixing screw can be attained by forming the structure wherein the diameter of the shaft holding hole 52 is formed slightly larger than that of the main guide shaft 17, wherein inwardly projecting left and right ribs are provided so as to confront each other, on the left and right sides on the inner surface of the shaft holding hole 52, with the distance between the left and right ribs made slightly smaller than the diameter of the main guide shaft 17, wherein inwardly projecting upper and lower ribs are provided, so as to be displaced from each other (i,e., without mutually confronting), on the upper and lower sides on the inner surface of the shaft holding hole 52, with the distance between the upper and lower ribs formed slightly smaller than the diameter of the main guide shaft 17, and wherein the main guide shaft 17 are thereby pressed between the left and right ribs and between the upper and lower ribs of the shaft holding hole 52.

FIG. 6(*b*) illustrates a bearing stand 55 for guide shaft adjusting member 19*a* to 19*c* in which the other end portion of the main guide shaft 17 and both end portions of the auxiliary guide shaft 18 are to be inserted and held. One side surface of this bearing stand 51 comprises therein a front shaft holding groove 56 in which one of the end portions of the main and auxiliary guide shafts 17 and 18 is to be inserted; a space portion 57 which is to be connected with this front shaft holding groove 56, in which the elastic member 41 is to be inserted and placed, and in which the spherical front end 37*a* is to be inserted between the adjusting screw body 37 and the guide shaft; and a rear shaft holding groove 58 which is connected with the space portion 57, and which has substantially the same shape as the front shaft holding groove 56. When the elastic member 41 is to be inserted and placed in the space portion 57, the positioning portions 43 of the elastic member 41 are arranged so as to be each situated in the front shaft holding groove 56 and the rear shaft holding groove 58.

Thereby, it is possible to place the end portions of the main and auxiliary guide shafts 17 and 18 on the tilting portion 42 having the same tilting direction, by using the elastic members 41 having the shapes such that the relational positions between the tilting portions 42 and the positioning portions 43 of the elastic members 41 are the same.

Specifically, as shown in FIG. 6(*c*), for example, bearing stands 55 and 55' in FIG. 6(*b*) for the guide shaft adjusting and holding members 19*b* and 19*c* which hold and fix both end portions of the auxiliary guide shaft 18 can be employed. These bearing stands 55 and 55' are fixed to the above-described chassis 12 so that the front shaft holding member 56 and 56' thereof are opposed to each other, and the positioning portion 43 of the elastic member 41 is placed on the front shaft holding member 56' of the bearing stand 55' which corresponds to one guide shaft adjusting and holding members 19*b* of the auxiliary guide shaft 18, while the positioning portion 43 of the elastic member 41 is placed on the rear shaft holding member 58 of the bearing stand 55 which corresponds to the other guide shaft adjusting and holding members 19*c* of the auxiliary guide shaft 18. Thereby, the tilting portions 42 and 42 of the elastic members 41 and 41 inserted into the space portions 57 and 57' of both bearing stands 55 and 55' have tilting surface with the same tilting direction.

Meanwhile, the bearing stand 55 at the guide shaft adjusting and holding members 19*a* at the other end portion of the main guide shaft 17 is used in the same manner as the above-described the bearing stand 55' used in the one guide shaft adjusting and holding members 19*b* of the auxiliary guide shaft 18.

Thereby, the guide shaft adjusting and holding members 19*a* to 19*c* can be formed using the bearing stands 55, the elastic members 41, the adjusting screws 37, and the adjusting screw support plates 35 which have the same shape and size, respectively.

Figure 7A:
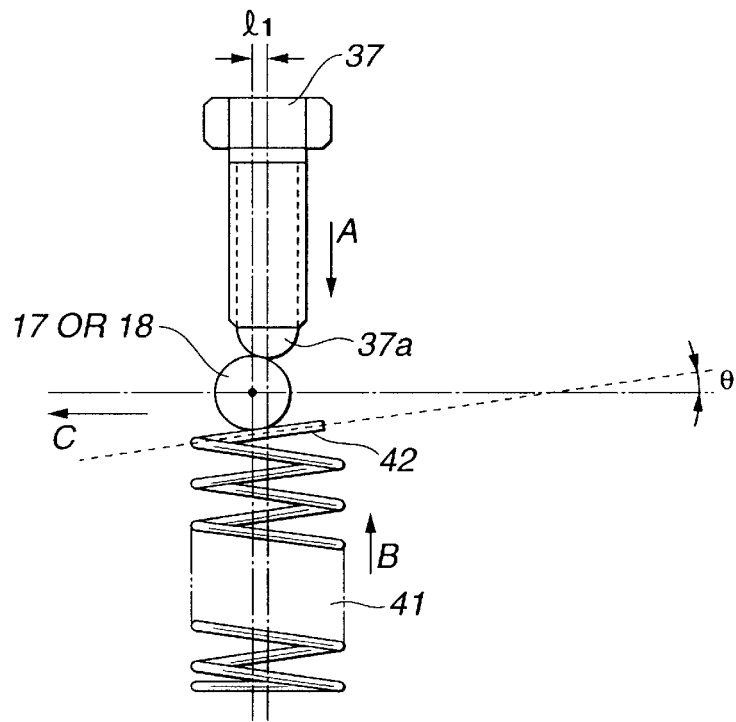
FIGS. 7(a) and 7(b) are views explaining the relationship among the guide shaft, the elastic member, and the adjusting screw of the optical-disk pickup guide shaft adjusting device according to the present invention.

Next, the relationship among the center of the main or auxiliary guide shaft 17 or 18, the center of the adjusting screw 37, and the tilting direction of the tilting portion 42 of the elastic member 41 will be described with reference to FIG. 7(*a*) and 7(*b*).

As shown in FIG. 7(*a*), when the adjusting screw 37 is arranged so that the center thereof deviates in the right direction in the figure from the center of the guide shaft 17 or 18 (the center of the shaft holding groove 58), by the dimension "l1", the elastic member 41 is inserted into the bearing stand 55 so that the tilting portion 42 thereof has a rightward tilt in the deviation direction of the adjusting screw 37. Thereby, the guide shaft 17 or 18 placed on the elastic member 41, is firstly moved in the direction indicated by the arrow C in the figure by the tilting portion 42 of the elastic member 41. With this being the situation, the deviation of the center of the adjusting screw 37 from the center of the guide shaft 17 or 18 increases, and the adjusting screw 37 is advanced in the direction indicated by the arrow A by the rotation thereof. When the front end of the adjusting screw 37 comes to contact the guide shaft 17 or 18, the guide shaft 17 or 18 further undergoes the force in the direction indicated by the arrow C, with the addition of an elastic force of the elastic member 41 in the direction indicated by the arrow B.

Figure 7B:
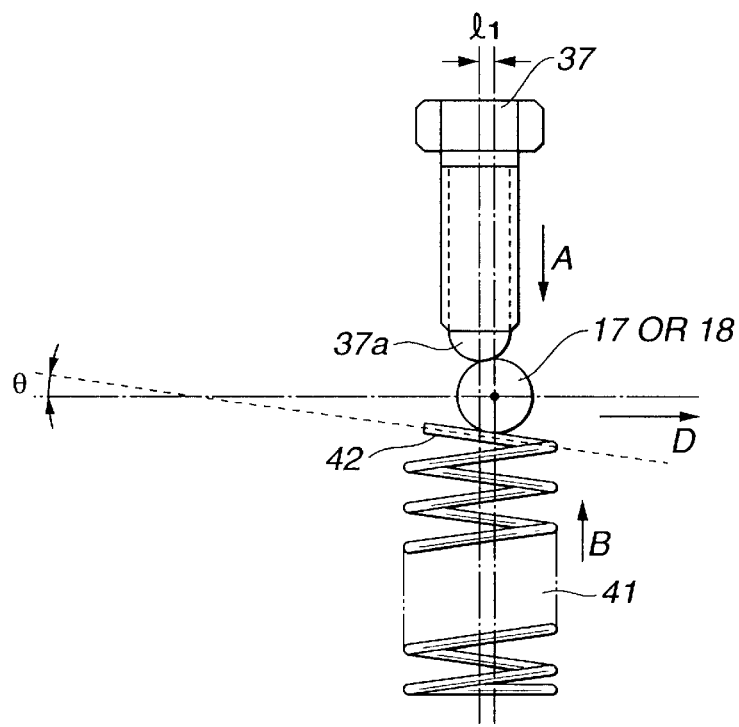
Figure 8:
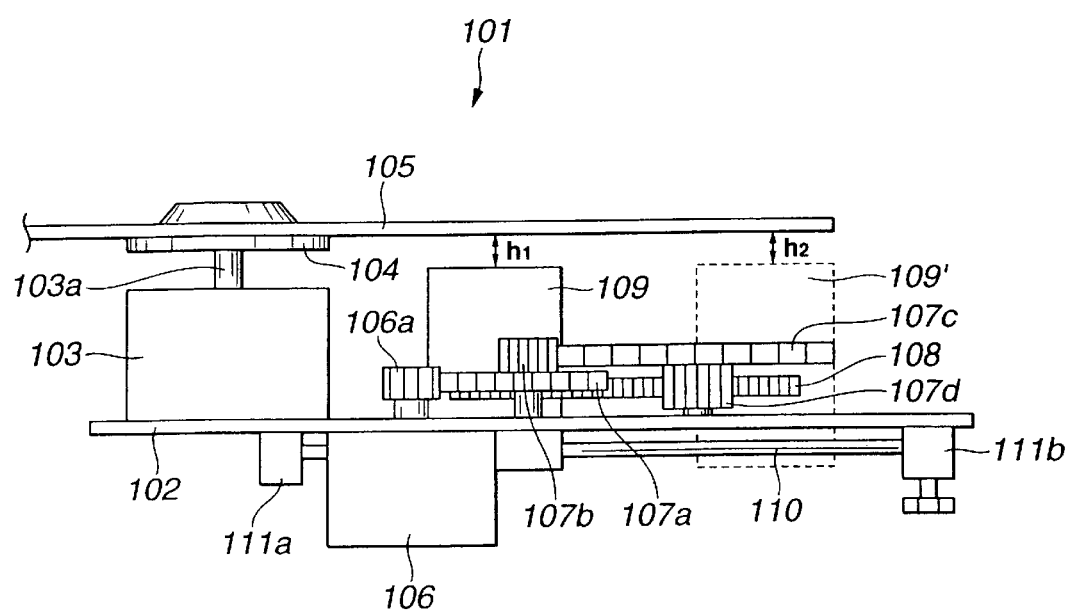
FIG. 8 is a side view showing the configuration of a pickup unit in a conventional optical-disk recording or reproducing device.
Figure 9:
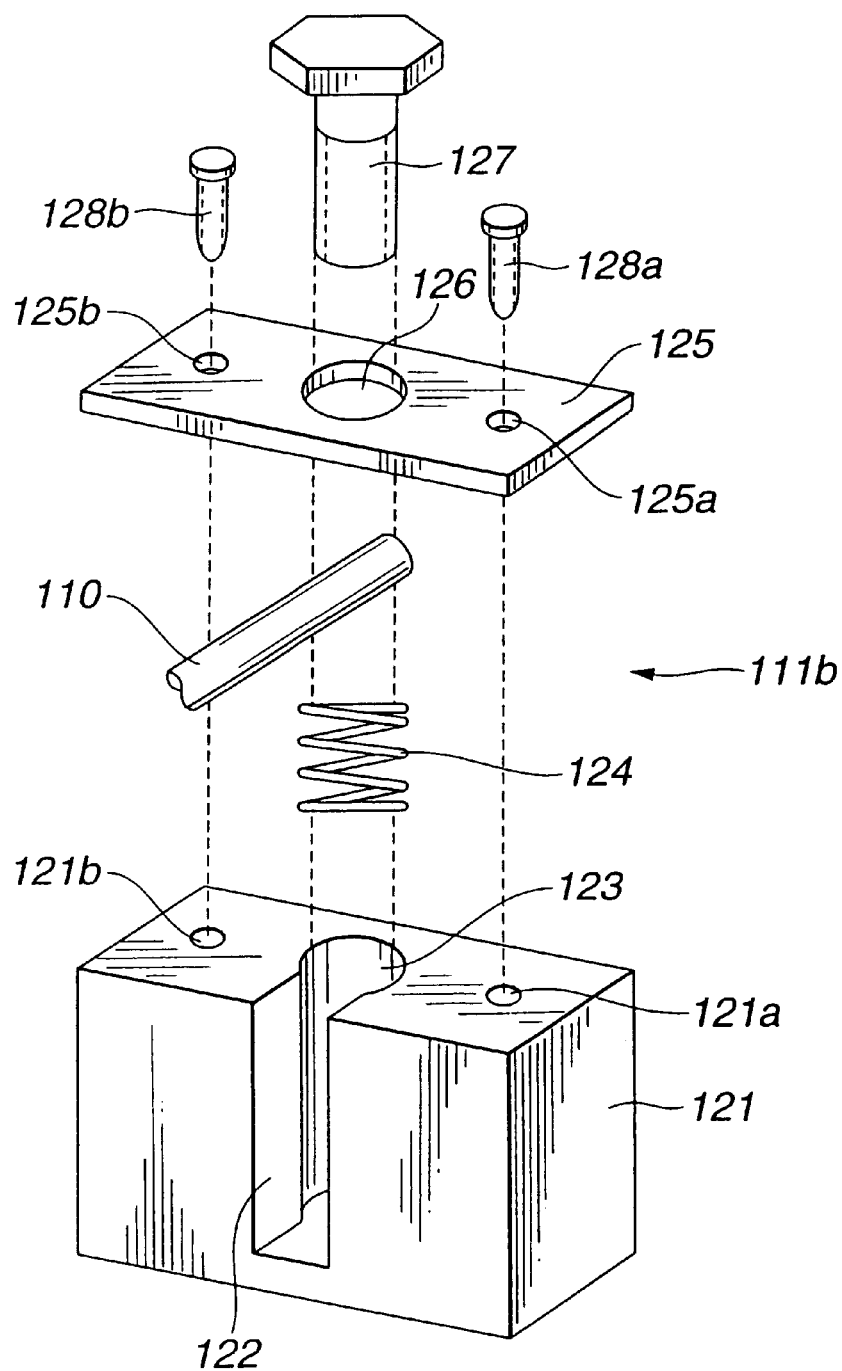
FIG. 9 is a developed perspective view showing the conventional guide shaft holding member.
Figure 10:
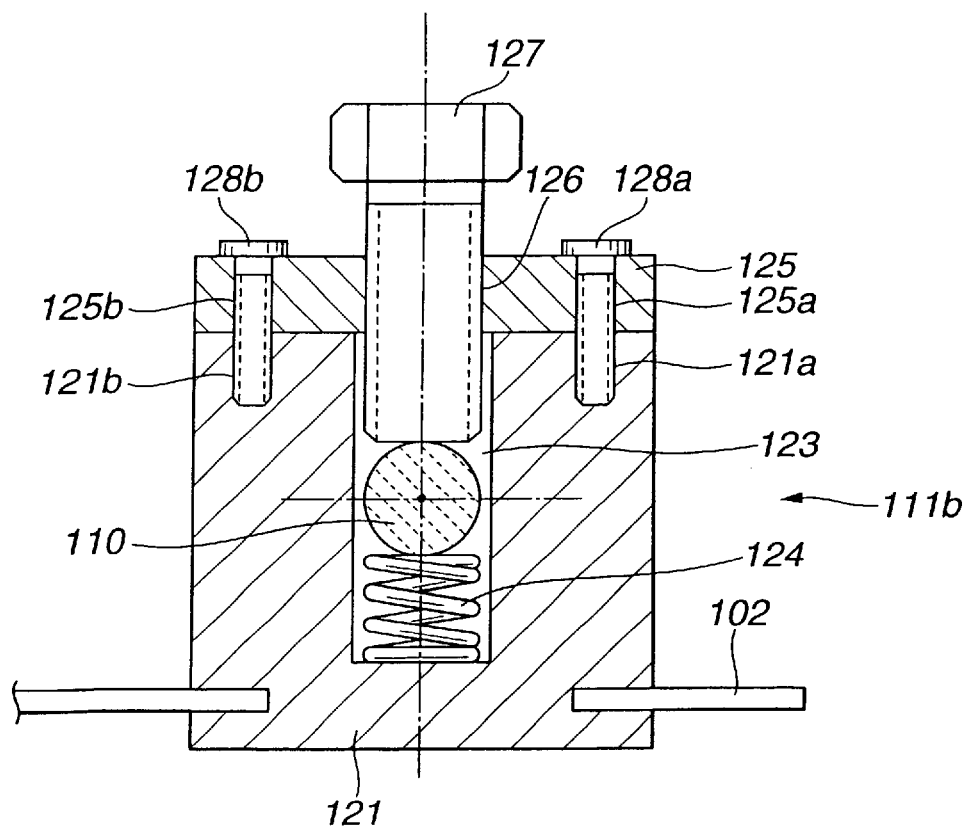
FIG. 10 is an exploded section view showing the conventional guide shaft holding member.
Figure 11:
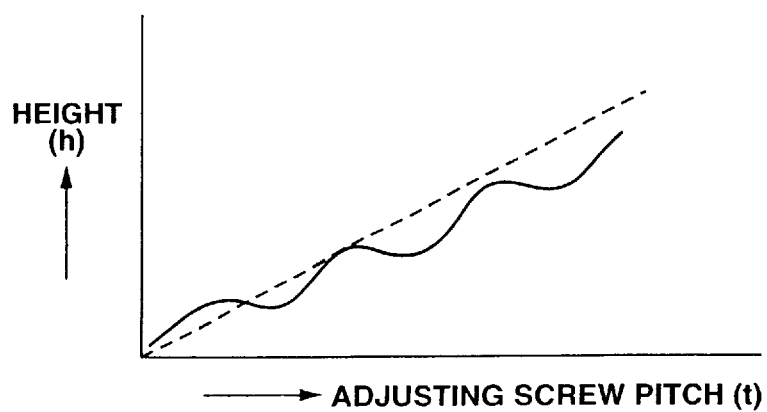
FIG. 11 is a diagram explaining a problem associated with the conventional guide shaft holding member.

Also, as shown in FIG. 7(b), when the adjusting screw 37 is arranged so that the center thereof deviates in the left direction in the figure from the center of the guide shaft 17 or 18 (the center of the shaft holding groove 58), by the dimension "l1", the elastic member 41 is inserted into the bearing stand 55 so that the tilting portion 42 thereof has a leftward tilt in the deviation direction of the adjusting screw 37. Thereby, the guide shaft 17 or 18 placed on the elastic member 41, is firstly moved in the direction indicated by the arrow D in the figure by the tilting portion 42 of the elastic member 41. With this being the situation, the deviation of the center of the adjusting screw 37 from the center of the guide shaft 17 or 18 increases, and the adjusting screw 37 is advanced in the direction indicated by the arrow A by the rotation thereof. When the front end of the adjusting screw 37 comes to contact the guide shaft 17 or 18, the guide shaft 17 or 18 further undergoes the force in the direction indicated by the arrow D, with the addition of an elastic force of the elastic member 41 in the direction indicated by the arrow B.

In other words, by deviating the center of the adjusting screw 37 from that of the guide shaft 17 or 18 toward the higher side in the tilting direction of the tilting portion 42 of the elastic member 41, the guide shaft 17 or 18 is pressed to either of the side surfaces of the shaft holding groove 56 and 58 (not shown) of the bearing stand 55, thereby allowing a shaft deviation when performing the positional adjustment of the guide shaft 17 or 18 by the adjusting screw 37 to be eliminated.

The setting of the arrangement position of the tilting portion 42 of the elastic member 41 and the setting of the deviation of the center of the adjusting screw 37 from that of the guide shaft 17 or 18 can be easily realized by changing the installation direction of the adjusting screw support plate 35 with respect to the bearing stand 31 or 55.

The center deviation amount of the adjusting screw 37 in the embodiments shown in FIGS. 4(a) and 4(b), FIG. 5, FIGS. 6(a), 6(b), and 6(c), and FIGS. 7(a) and 7(b) can be set to be smaller than that in the embodiments shown in FIGS. 1(a) and 1(b), FIGS. 2 and 3. Depending on the tilting angle of the tilting portion 42 of the elastic member 41, it is not impossible to eliminate a center deviation amount.

As described above, in the optical-disk pickup guide shaft adjusting device according to the present invention, by placing the center of the adjusting screw so as to deviate from that of the pickup guide shaft, forming the surface of the elastic member which is in contact with the guide shaft and which clamps the guide shaft between this elastic member and the adjusting screw, as a tilting surface, and forming the front end of the adjusting screw which is in contact with the guide shaft as a semispherical shape, the positional adjustment of the guide shaft by the adjusting screw can be linearly performed, thereby allowing a fine positional adjustment of the guide shaft.

Industrial Utilizability

The above-described optical-disk pickup guide shaft adjusting device according to the present invention is useful for an optical-disk recording or reproducing device. The optical-disk pickup guide shaft adjusting device according to the present invention allows a fine and lineal variable-adjustment of the relative position relation of the pickup with respect to the optical disk, and has an effect of facilitating the optimum setting of pickup installation position.

Furthermore, in the optical-disk pickup guide shaft adjusting device according to the present invention, the bearing stands constituting the holding members which hold the pickup guide shafts and which adjust the positions thereof, the elastic members, the adjusting screws, the adjusting screw support plates, etc., can be each formed in single shapes and single sizes. This provides effects of reducing the number of components and of allowing the efficiency of assembly work to be enhanced.

What is claimed is:

1. An optical disc player comprising:
   a pickup configured to perform writing or reading of information by irradiating a recording medium with laser rays;
   a guide shaft configured to movably support the pickup;
   a holding member having a bearing portion provided with a groove portion configured to have an end portion of said guide shaft inserted thereinto;
   a spring provided in the groove portion and configured to elastically support the end portion of the guide shaft inserted into the groove portion, a first end of the spring having a tilting portion that tilts with respect to a plane surface at the end portion and a second end of the spring having a positioning portion that projects from a circular outer configuration of the spring, the tilting portion configured to deviate the guide shaft toward the spring when the end portion of the guide shaft is supported thereon, and the positioning portion configured to retain the spring with respect to the bearing portion to maintain an orientation of the tilted portion;
   an engaging portion provided at a bottom of the groove portion, the engaging portion configured to engage the positioning portion when the spring is disposed in the groove portion; and
   an adjusting screw configured to adjust a holding position of said guide shaft within said holding member to move the guide shaft against an elastic force of the spring by rotating the screw such that an end of the screw presses against an outer surface of the guide shaft and the end portion of the guide shaft deviates toward the tilting portion of the spring.

2. An optical disc player according to claim 1, comprising:
   a pair of said holding members,
   wherein said holding members hold both end portions of said guide shaft, and
   wherein said springs in said holding members are placed so that said tilting portions thereof have a same tilting direction.

3. An optical disc player according to claim 1, wherein:
   said guide shaft has a substantially circular cross-section, and
   said screw has a front end which is configured to contact said guide shaft and has a substantially semicircular shape.

4. An optical disc player according claim 1, comprising:
   a plurality of said holding members; and said guide shaft comprising a main guide shaft and an auxiliary guide shaft;

wherein said holding members are configured to hold one end portion of said main guide shaft and both end portions of said auxiliary guide shaft.

5. An optical disc player comprising:

a pickup configured to perform writing or reading of information by irradiating a recording medium with laser rays;

a guide shaft configured to movably support the pickup;

a holding member having a bearing portion provided with a groove portion configured to have an end portion of said guide shaft inserted thereinto;

a spring provided in the groove portion and configured to elastically support the end portion of the guide shaft inserted into the groove portion, a first end of the spring having a tilting portion that tilts with respect to a plane surface at the end portion and a second end of the spring having a positioning portion that projects from a circular outer configuration of the spring, the tilting portion configured to deviate the guide shaft toward the spring when the end portion of the guide shaft is supported thereon, and the positioning portion configured to retain the spring with respect to the bearing portion to maintain an orientation of the tilted portion;

an engaging portion provided at a bottom of the groove portion, the engaging portion configured to engage the positioning portion when the spring is disposed in the groove portion; and an adjusting screw configured to adjust a holding position of said guide shaft within said holding member to move the guide shaft against an elastic force of the spring by rotating the screw such that an end of the screw presses against an outer surface of the guide shaft and the end portion of the guide shaft deviates toward the tilting portion of the spring, the adjusting screw disposed such that a center thereof is deviated in a direction away from the tilting portion of the spring in a widthwise direction of the guide shaft positioned on the spring.

6. An optical disc player according to claim 5, comprising:

an adjusting screw support plate provided with a screw hole, said support plate mounted on a top surface of the groove portion of said bearing portion and configured to effect setting of the deviation of the center of the adjusting screw.

7. An optical disc player according to claim 5, comprising:

a pair of said holding members, wherein said holding members hold both end portions of said guide shaft, and said adjusting screws in said holding members are placed so that the centers thereof deviate in a same direction in the widthwise direction of said guide shaft.

8. An optical disc player according to claim 5, comprising:

a pair of said holding members, wherein said holding members hold both end portions of said guide shaft, and wherein said springs in said holding members are placed so that said tilting portions thereof have a same tilting direction.

9. An optical disc player according to claim 5, comprising:

a pair of said holding members, wherein said holding members hold both end portions of said guide shaft, said adjusting screws in said holding members are placed so that the centers thereof deviate in a same direction in the widthwise direction of said guide shaft, and said springs in said holding members are placed so that said tilting portions thereof have a same tilting direction.

10. An optical disc player according to claim 5, wherein:

said guide shaft has a substantially circular cross-section, and said screw has a front end which is configured to contact said guide shaft and has a substantially semicircular shape.

11. An optical disc player according claim 5, comprising:

a plurality of said holding members; and said guide shaft comprising a main guide shaft and an auxiliary guide shaft;

wherein said holding members are configured to hold one end portion of said main guide shaft and both end portions of said auxiliary guide shaft.

* * * * *